United States Patent
Schad et al.

(10) Patent No.: US 10,651,638 B1
(45) Date of Patent: May 12, 2020

(54) ELECTRICAL JUNCTION BOX SHELL APPARATUS WITH ENHANCED INSULATION

(71) Applicants: Lucas Tucker Schad, Livingston, MT (US); William O. Hicks, Litchfield, MN (US)

(72) Inventors: Lucas Tucker Schad, Livingston, MT (US); William O. Hicks, Litchfield, MN (US)

( * ) Notice: Subject to any disclaimer, the term of this patent is extended or adjusted under 35 U.S.C. 154(b) by 83 days.

(21) Appl. No.: 15/646,523

(22) Filed: Jul. 11, 2017

Related U.S. Application Data

(60) Provisional application No. 62/334,936, filed on May 11, 2016.

(51) Int. Cl.
*H02G 3/08* (2006.01)
*H02G 3/12* (2006.01)
*H01B 17/56* (2006.01)

(52) U.S. Cl.
CPC .............. *H02G 3/081* (2013.01); *H01B 17/56* (2013.01); *H02G 3/12* (2013.01)

(58) Field of Classification Search
CPC ........... H02G 3/081; H02G 3/12; H01B 17/56
See application file for complete search history.

(56) References Cited

U.S. PATENT DOCUMENTS

| | | | | |
|---|---|---|---|---|
| 4,080,518 A | * | 3/1978 | Marrero | H01H 23/12 200/51 R |
| 4,408,695 A | * | 10/1983 | Balkwill | H02G 3/088 174/57 |
| 4,757,158 A | | 7/1988 | Lentz | |
| 5,834,692 A | | 11/1998 | Lentz | |
| 6,239,365 B1 | * | 5/2001 | McEvers | H02G 3/088 174/50 |
| 6,872,885 B1 | * | 3/2005 | Newbold, Jr. | H02G 3/125 174/58 |
| 6,874,295 B2 | | 4/2005 | Anderson | |
| 8,124,872 B2 | * | 2/2012 | Vigorito | B29C 45/14311 174/50 |
| 9,444,236 B2 | * | 9/2016 | Witherbee | H02G 3/126 |

* cited by examiner

*Primary Examiner* — Rick K Chang
(74) *Attorney, Agent, or Firm* — Plager Schack LLP; Mark H. Plager; Eric Liou

(57) ABSTRACT

A shell apparatus to enhance insulation and prevent air transmission of an electrical junction box coupled to a stud is provided. The electrical junction box includes at least one wire coupled to a housing member and positioned within a wall cavity between a front wall and rear wall. The housing member of the electrical junction box includes an opening aligned with an opening in the front wall. The shell apparatus includes a foldable sheet with a center portion, a first flap, a second flap, and a third flap. The first and second flaps are coupled to the stud, and the third flap is coupled to the rear wall to permit the foldable sheet to enclose the electrical junction box's housing. An expansion foam is disposed between the foldable sheet and electrical junction box to entirely fill the void between the front wall, rear wall, foldable sheet and electrical junction box.

6 Claims, 4 Drawing Sheets

ELECTRICAL JUNCTION BOX SHELL APPARATUS WITH ENHANCED INSULATION

RELATED APPLICATION

The application claims priority to provisional patent application U.S. Ser. No. 62/334,936 filed on May 11, 2016, the entire contents of which is herein incorporated by reference.

BACKGROUND

The embodiments herein relate generally to the insulation and prevention of air transmission of electrical junction boxes.

Electrical junction boxes provide electrical fixtures such as switches, electrical outlets, computer outlets, television and internet cable outlets, telephone outlets, and the like, throughout a building. These electrical junction boxes generally comprise a housing coupled to a stud and at least one opening to receive one or more wires/conduits that are connected to the electrical fixture. The opening of the junction box's housing is aligned with an opening in the front wall to expose at least one electrical fixture to the occupants of the building.

The International Energy Conservation Code (IECC) requires electrical junction boxes coupled to walls in buildings to be air tight. This insulation of electrical junction boxes helps to minimize air leaks through gaps between the stud, junction box and/or walls. Sealing these gaps through insulation minimizes the loss of heating or cooling air from the building's interior and prevents the transmission of noise through the walls from one room to another room.

Several electrical junction box insulating devices and outer boxes exist as disclosed in U.S. Pat. Nos. 4,757,158, 5,834,692 and 6,874,295. However, these devices and boxes have several limitations: 1) They require a difficult installation where the user has to remove portions of the device to create openings to permit wires coupled to the junction box to pass through; and/or 2) After the installation, voids remain present between the device and the electrical junction box. As a result, these devices and boxes are a burden to use and/or limited in their effectiveness in creating a complete seal in the surrounding area to improve insulation of the electrical junction box.

As such, there is a need in the industry for an electrical junction box shell apparatus that addresses the limitations of the prior art, which is easy to install and more effective in insulating the electrical junction box.

SUMMARY

A shell apparatus to enhance insulation of an electrical junction box coupled to a stud is provided. The electrical junction box comprises at least one wire coupled to a housing member and positioned within a wall cavity defined by space between a front wall and a rear wall. The housing member of the electrical junction box comprises an opening aligned with an opening in the front wall.

In certain embodiments, the shell apparatus comprises a foldable sheet comprising a center portion, a first flap pivotably attached to a first side edge of the center portion, a second flap pivotably attached to a second side edge of the center portion opposite the first side edge, and a third flap pivotably attached to a third side edge of the center portion, each flap in the first and second flaps comprising a linear cut extending from an edge of the flap to an intermediate portion of the flap, the linear cut configured to receive the at least one wire therethrough, wherein the first flap is configured to pivotably adjust to couple to the stud, the second flap is configured to pivotably adjust to couple to the stud, and the third flap is configured to pivotably adjust to couple to the rear wall to permit the foldable sheet to enclose the housing of the electrical junction box, and an expansion foam disposed between the foldable sheet and the electrical junction box to entirely fill a void between the front wall, rear wall, foldable sheet and electrical junction box.

In certain embodiments, a method to enhance insulation of an electrical junction box coupled to a stud is provided. The method comprises providing the shell apparatus, folding the first flap, second flap and third flap of the shell apparatus to permit the foldable sheet to enclose the housing of the electrical junction box, fastening the first and second pairs of tabs to the stud, fastening the third flap to the rear wall, and disposing an expansion foam between the foldable sheet and the electrical junction box to entirely fill a void between the front wall, rear wall, foldable sheet and electrical junction box.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
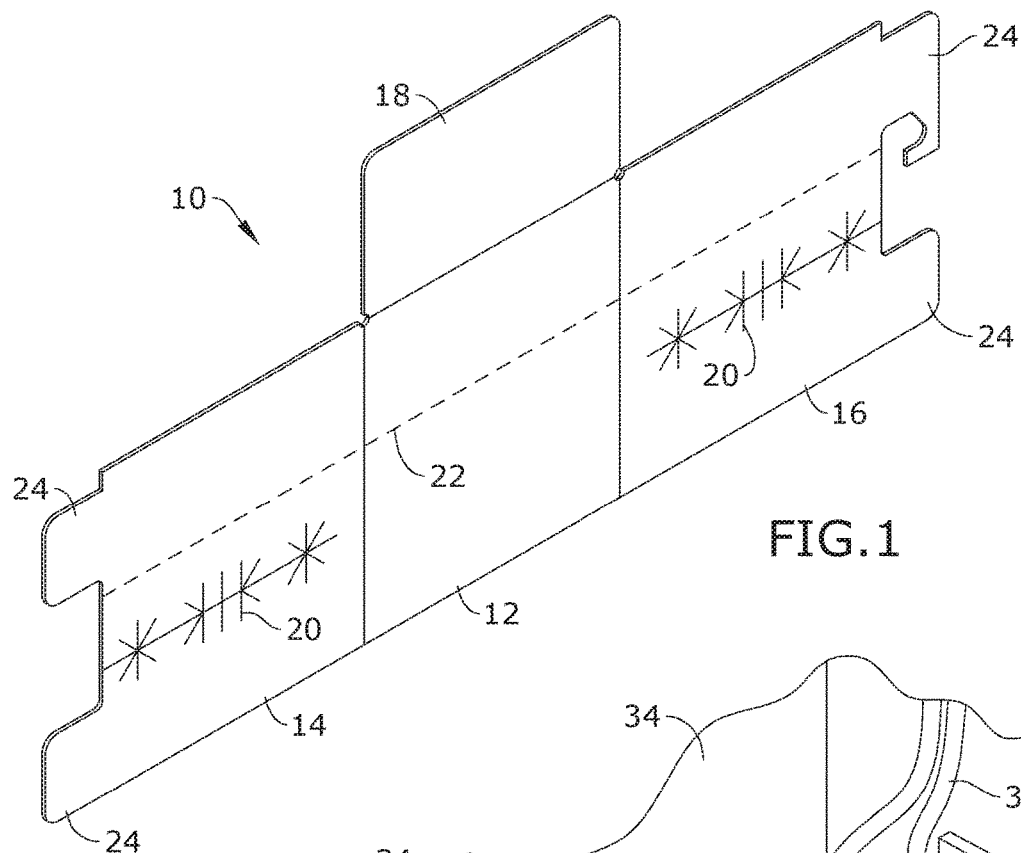
FIG. 1 depicts a perspective view of certain embodiments of the shell apparatus.

As depicted in FIGS. 1-3 and 6, shell apparatus 10 is configured to enhance insulation of electrical junction box 26 coupled to stud 32. In this configuration, electrical junction box 26 is positioned within a wall cavity between exterior wall 34 and drywall 38. Electrical junction box 26 comprises one or more wires 30 coupled to a housing, which comprises an opening aligned with an opening in drywall 38 in one embodiment depicted in FIG. 6. Wires 30 may be connected to any fixtures disposed within the electrical junction box's housing. Exemplary fixtures include first fixture 40 such as an electrical switch and second fixture 42 such as an electrical socket.

In certain embodiments, shell apparatus 10 generally comprises a foldable sheet comprising central portion 12, first flap 14, second flap 16 and third flap 18. In a preferred embodiment, the foldable sheet is made from paper cardboard. However, alternative materials known in the field may be used instead such as plastic, rubber, and other materials. Each flap in first flap 14 and second flap 16 comprises a pair of tabs 24 on the outer edge. In one embodiment, first and second flaps 14, 16 comprise wire slit 20, which comprises a linear cut configured to receive one or more wires 30 therethrough. In one embodiment, marked fold line 22 is disposed along first flap 14, center portion 12 and third flap 16. In one embodiment, marked fold line 22 extends linearly along the foldable sheet. Marked fold line 22 serves as a visual marker to the user to fold shell apparatus 10 in certain desirable configurations. Marked fold line 22 may comprise perforations disposed thereon in certain embodiments.

Figure 2:
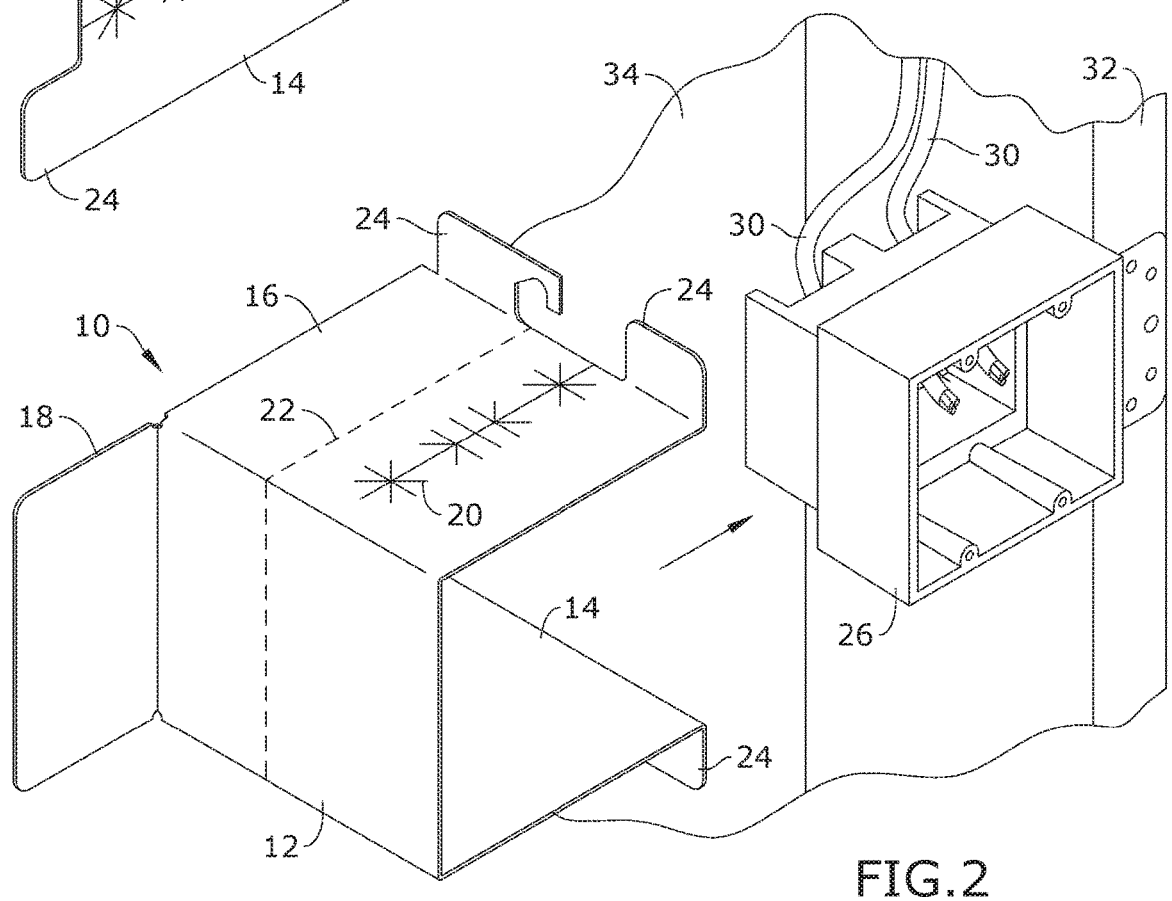
FIG. 2 depicts a perspective view of certain embodiments of the shell apparatus in a folded configuration.
Figure 3:
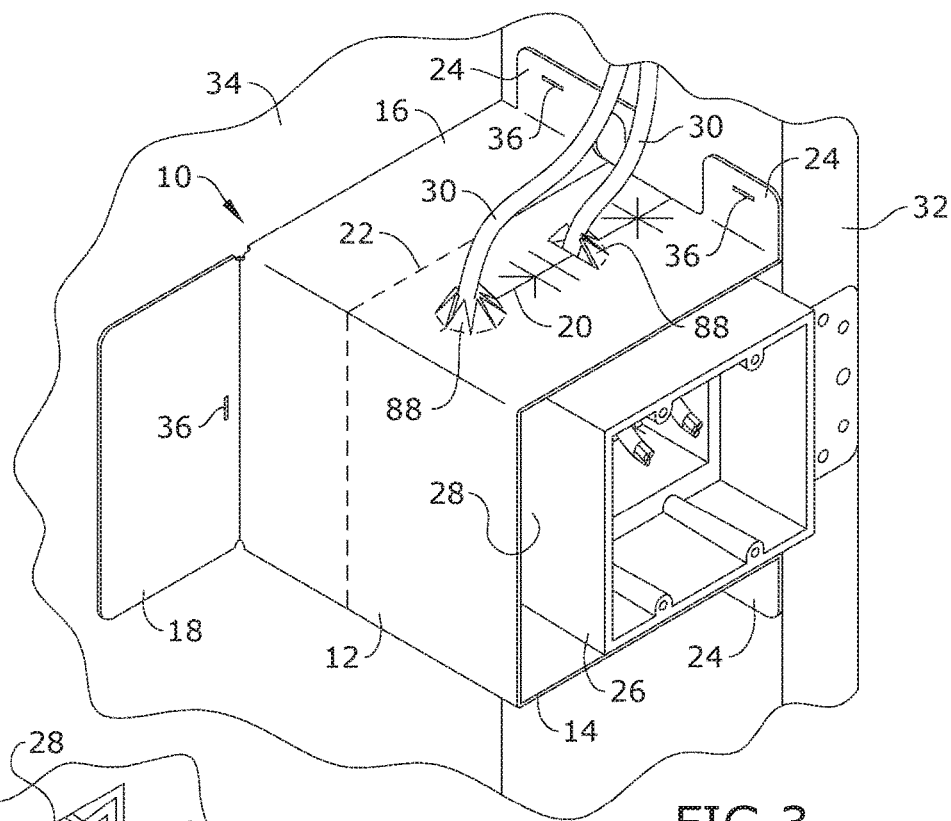
FIG. 3 depicts a perspective view of certain embodiments of the shell apparatus shown in use.

In operation, shell apparatus 10 is installed after electrical junction box 26 has been installed. Once electrical junction box 26 has been installed and "rough-wired", shell apparatus 10 is folded to create a shell that is disposed around electrical junction box 26. As depicted in FIG. 2, first flap 14, second flap 16 and third flap 18 are folded to create the shell for use when stud 32 is a 1½"×5½" configuration. Tabs 24 on first and second flaps 14, 16 are folded down and up respectively. As depicted in FIG. 3, shell apparatus is maneuvered to permit wires 30 to slide along wire slit 20 in second flap 16. In one embodiment, wire slit 20 comprises a plurality of prongs 88 pivotably mounted thereto. Once wires 30 are positioned in the desired position, prongs 88 flex around wires 30. In one embodiment, tape (not shown) may be used to close any remaining gaps that may be present.

Mechanical fasteners 36 such as staples are used to secure shell apparatus 10 in place. Specifically, mechanical fasteners 36 are used to couple tabs 24 of first and second flaps 14, 16 to stud 32. Another mechanical fastener 36 is used to couple third flap 18 to exterior wall 34. In this configuration, center portion 12, first flap 14, second flap 16 and third flap 18 of the foldable sheet enclose electrical junction box 26 and portions of wires 30.

Figure 4:
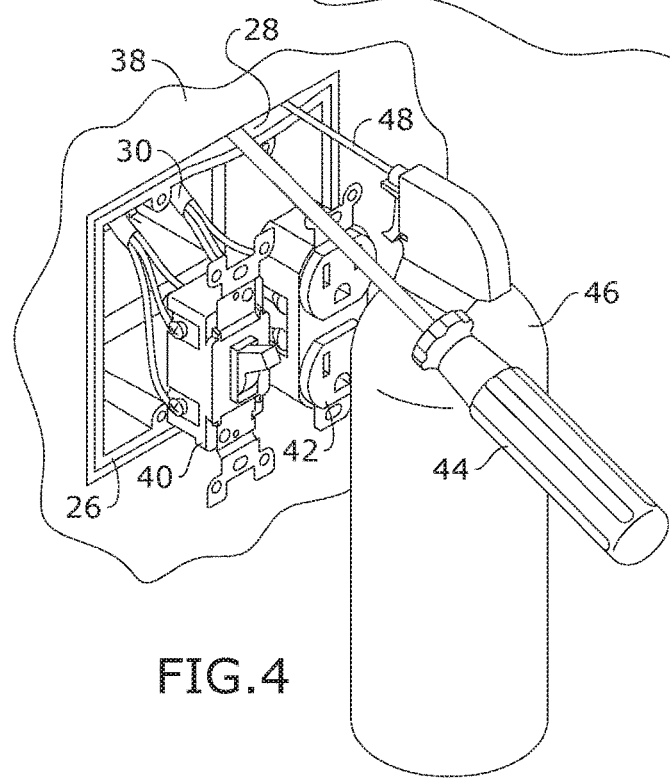
FIG. 4 depicts a perspective view of certain embodiments of the shell apparatus shown in use.

In one embodiment, wall cavity insulation 52 such as fiberglass material is disposed in the wall cavity between shell apparatus 10, stud 32 and exterior wall 34. Dry wall 38 is installed around the housing opening of electrical junction box 26. As depicted in FIG. 4, first and second fixtures 40, 42 are coupled to wires 30. Expansion foam 50 from spray can 46 is used to fill the remaining voids in foam cavity 28 between the foldable sheet of shell apparatus 10 and electrical junction box 26. A tool such as screwdriver 44 may be used to create a larger opening for injection straw 48 of spray can 46 to reach foam cavity 28.

Figure 5:
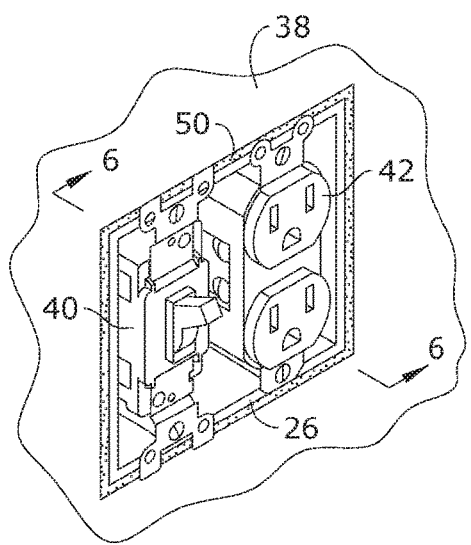
FIG. 5 depicts a perspective view of certain embodiments of the shell apparatus shown in use.
Figure 6:
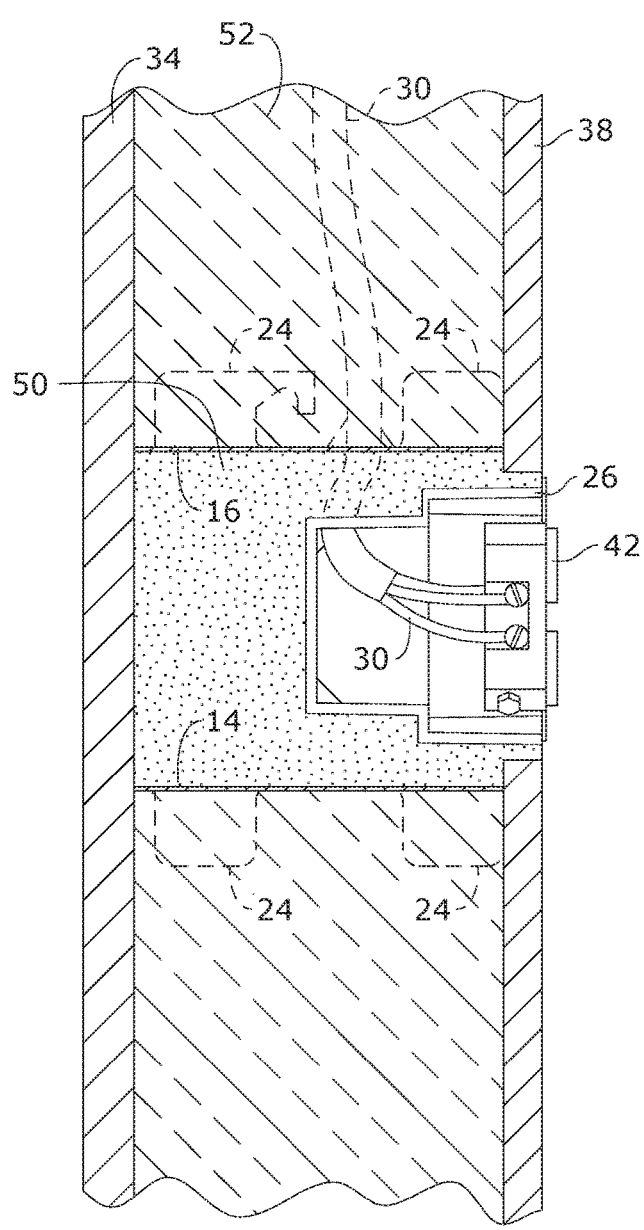
FIG. 6 depicts a section view of certain embodiments of the shell apparatus taken along line 6-6 in FIG. 5.

Expansion foam 50 is preferably a low expansion latex spray foam. However, expansion foam 50 may be made from polyurethane or intumescent fire rated foam in other embodiments. As depicted in FIGS. 5-6, expansion foam 50 is disposed from spray can 46 to create a seal around the portions of wires 30 entering electrical junction box 26 and the remaining voids present between exterior wall 34, dry wall 38, stud 32 and the foldable sheet of shell apparatus 10. Prongs 88 help to prevent expansion foam 50 from leaving the foldable sheet of shell apparatus 10. As depicted in FIGS. 5-6, expansion foam 50 in combination with the foldable sheet of shell apparatus 10 creates an air tight seal that fully insulates electrical junction box 26. Once expansion foam 50 cures, first and second fixtures 40, 42 are coupled to electrical junction box 26.

In this assembled configuration, shell apparatus 10 and expansion foam 50 create an air tight barrier which prevents or minimizes the overall loss of conditioned air through the area surrounding electrical junction box 26. In addition, sound transmission through the area surrounding electrical junction box 26 is minimized.

Figure 7:
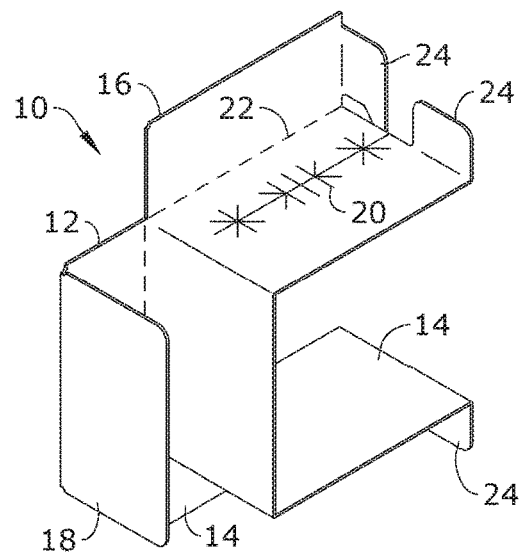
FIG. 7 depicts a perspective view of certain embodiments of the shell apparatus in an alternate folded configuration.
Figure 8:
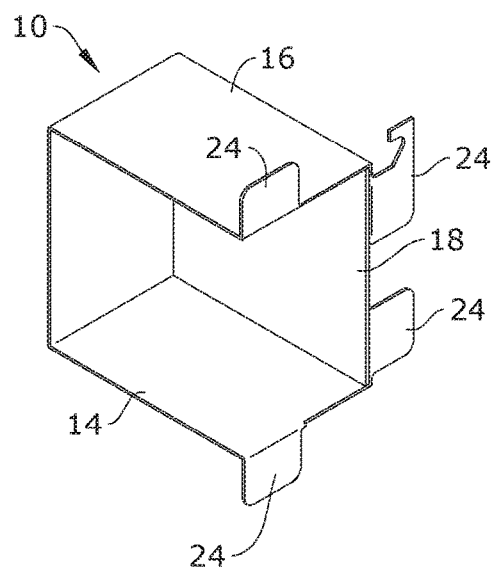
FIG. 8 depicts a perspective view of certain embodiments of the shell apparatus in an alternate folded configuration.
Figure 9:
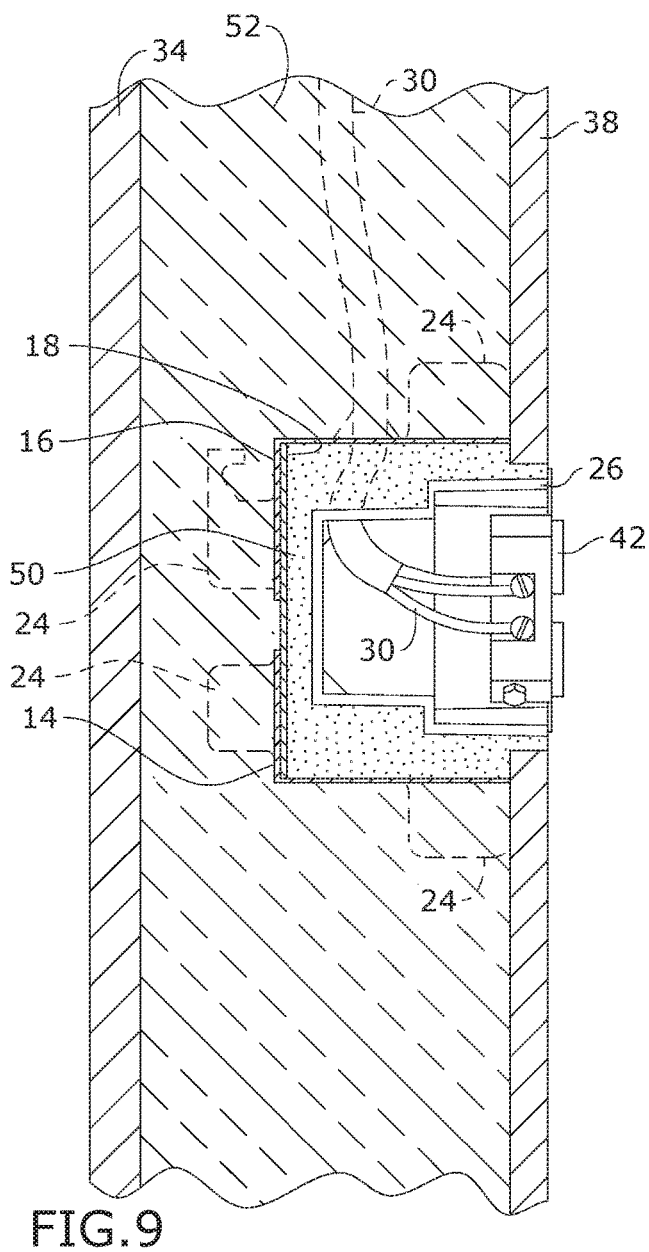
FIG. 9 depicts a section view of certain embodiments of the shell apparatus illustrating the alternate folded configuration in use.

FIG. 7 depicts shell apparatus 10 folded in an alternate configuration for use with electrical junction box 26 when stud 32 is a 1½"×3½" configuration. FIG. 8 depicts shell apparatus 10 folded in an alternate configuration for use with electrical junction box 26 when stud 32 is a 1½"×5½" configuration. Shell apparatus 10 is installed in substantially the same manner as discussed before by folding the foldable sheet and fastening tabs 24 to stud 32. As depicted in FIG. 9, this configuration permits wall cavity insulation 52 to be installed between exterior wall 34 and the foldable sheet of shell apparatus 10. Expansion foam 50 is inserted within foam cavity 28 to fill the voids between the foldable sheet of shell apparatus 10, stud 32 and dry wall 38.

In an alternative embodiment, shell apparatus 10 may be used in a different configuration with an adjustable depth electrical junction box. The position of this specialty electrical junction box may be adjusted within the wall cavity. As a result, it is desirable to prevent any wall cavity foam 86 from adhering to electrical junction box 26. This enables electrical junction box 26 to be adjusted to different positions without any restrictions.

Figure 10:
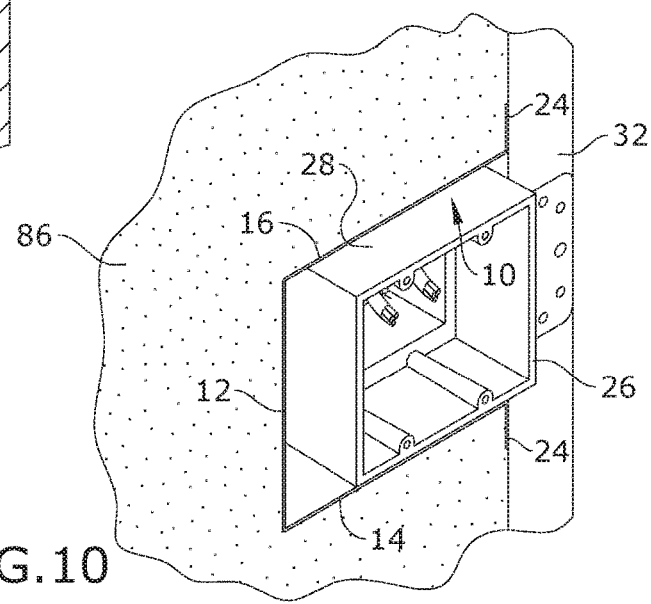
FIG. 10 depicts a perspective view of certain embodiments of the shell apparatus shown in use.

As depicted in FIG. 10, shell apparatus 10 is secured in place in the same manner as described before. The void in foam cavity 28 is left in place to permit electrical junction box 26 to be adjusted. Wall cavity foam 86 is disposed within the wall cavity outside of the foldable sheet of shell apparatus 10. In this manner, the foldable sheet serves as a barrier that prevents wall cavity foam 86 from reaching electrical junction box 26. In one embodiment, once electrical junction box 26 is adjusted to the desired position, expansion foam 50 can be disposed in foam cavity 28 to fill the void between electrical junction box 26 and the foldable sheet of shell apparatus 10. This creates a tighter seal and prevents air from leaking around electrical junction box 26.

It shall be appreciated that the components of shell apparatus 10 described in several embodiments herein may comprise any alternative known materials in the field and be of any color, size and/or dimensions. It shall be appreciated that the components of shell apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A shell apparatus to enhance insulation of an electrical junction box coupled to a stud, the electrical junction box comprising at least one wire coupled to a housing member and positioned within a wall cavity defined by space between a front wall and a rear wall, the housing member of the electrical junction box comprising an opening aligned with an opening in the front wall, the shell apparatus comprising:

a foldable sheet comprising a center portion, a first flap pivotably attached to a first side edge of the center portion, a second flap pivotably attached to a second side edge of the center portion opposite the first side edge, and a third flap pivotably attached to a third side edge of the center portion, each flap in the first and second flaps comprising a linear cut extending from an edge of the flap to an intermediate portion of the flap, the linear cut configured to receive the at least one wire therethrough, wherein the first flap is configured to pivotably adjust to couple to the stud, the second flap is configured to pivotably adjust to couple to the stud, and the third flap is configured to pivotably adjust to couple to the rear wall to permit the foldable sheet to enclose the housing of the electrical junction box;

a first pair of tabs pivotably mounted to the first flap and a second pair of tabs pivotably mounted to the second flap, the first and second pairs of tabs coupled to the stud and oriented so that the first pair of tabs aligns with the second pair of tabs;

a marked fold line disposed on the foldable sheet and extending along the first flap, center portion and second flap of the foldable sheet between the first and second pairs of tabs; and an expansion foam disposed between the foldable sheet and the electrical junction box to entirely fill a void between the front wall, rear wall, foldable sheet and electrical junction box, thereby insulating the electrical junction box.

2. The shell apparatus of claim 1, further comprising a plurality of prongs pivotably mounted to the linear cut in each flap of the first and second flaps, the plurality of prongs configured to pivotably adjust against a portion of the at least one wire to help retain the expansion foam within the foldable sheet.

3. The shell apparatus of claim 2, wherein the first and second pairs of tabs are coupled to the stud by mechanical fasteners and the third flap is coupled to the rear wall by another mechanical fastener.

4. The shell apparatus of claim 3, wherein the expansion foam is made from latex.

5. The shell apparatus of claim 3, wherein the expansion foam is made from polyurethane.

6. A shell apparatus to enhance insulation of an electrical junction box coupled to a stud, the electrical junction box comprising at least one wire coupled to a housing member and positioned within a wall cavity defined by space between a front wall and a rear wall, the housing member of the electrical junction box comprising an opening aligned with an opening in the front wall, the shell apparatus comprising:

a foldable sheet comprising a center portion, a first flap pivotably attached to a first side edge of the center portion, a second flap pivotably attached to a second side edge of the center portion opposite the first side edge, and a third flap pivotably attached to a third side edge of the center portion, each flap in the first and second flaps comprising a linear cut extending from an edge of the flap to an intermediate portion of the flap, the linear cut configured to receive the at least one wire therethrough, wherein the first flap is configured to pivotably adjust to couple to the stud, the second flap is configured to pivotably adjust to couple to the stud, and the third flap is configured to pivotably adjust to couple to the rear wall to permit the foldable sheet to enclose the housing of the electrical junction box;

a first pair of tabs pivotably mounted to the first flap and a second pair of tabs pivotably mounted to the second flap, the first and second pairs of tabs coupled to the stud and oriented so that the first pair of tabs aligns with the second pair of tabs;

a marked fold line disposed on the foldable sheet and extending along the first flap, center portion and second flap of the foldable sheet between the first and second pairs of tabs, a first portion of the marked fold line extending on the foldable sheet between one of the first pair of tabs and the linear cut on the first flap, a second portion of the marked fold line extending on the foldable sheet between one of the second pair of tabs and the linear cut on the second flap; and an expansion foam disposed between the foldable sheet and the electrical junction box to entirely fill a void between the front wall, rear wall, foldable sheet and electrical junction box, thereby insulating the electrical junction box.

* * * * *